(12) United States Patent
Haun

(10) Patent No.: US 7,169,725 B2
(45) Date of Patent: Jan. 30, 2007

(54) CERAMIC PRODUCTS, RAW BATCH FORMULATIONS, AND METHOD

(76) Inventor: Michael J. Haun, 5819 La Cuesta Dr., Santa Rosa, CA (US) 95409

(*) Notice: Subject to any disclaimer, the term of this patent is extended or adjusted under 35 U.S.C. 154(b) by 382 days.

(21) Appl. No.: 10/493,072

(22) PCT Filed: Oct. 8, 2002

(86) PCT No.: PCT/US02/32105

§ 371 (c)(1),
(2), (4) Date: Apr. 16, 2004

(87) PCT Pub. No.: WO03/033424

PCT Pub. Date: Apr. 24, 2003

(65) Prior Publication Data

US 2004/0255621 A1 Dec. 23, 2004

Related U.S. Application Data

(60) Provisional application No. 60/346,779, filed on Oct. 18, 2001.

(51) Int. Cl.
*C03B 19/00* (2006.01)
*C03B 19/01* (2006.01)
*C03C 10/00* (2006.01)

(52) U.S. Cl. .............................. 501/155; 501/2; 501/5; 65/17.3; 65/17.5; 65/27; 156/155

(58) Field of Classification Search ............... 50/2, 50/5, 155; 65/17.3, 17.5, 27; 156/155
See application file for complete search history.

(56) References Cited

U.S. PATENT DOCUMENTS

| 3,416,905 | A | | 12/1968 | Waugh | |
|---|---|---|---|---|---|
| 4,271,109 | A | * | 6/1981 | Boyce | 264/667 |
| 5,082,569 | A | * | 1/1992 | Homeier et al. | 210/679 |
| 5,583,079 | A | * | 12/1996 | Golitz et al. | 501/32 |
| 5,792,524 | A | * | 8/1998 | Lingart et al. | 428/34.4 |
| 5,830,251 | A | * | 11/1998 | Simpson et al. | 65/17.3 |
| 5,895,511 | A | * | 4/1999 | Tikhonova | 65/17.6 |
| 6,284,176 | B1 | | 9/2001 | Oujiri | |
| 6,296,699 | B1 | * | 10/2001 | Jin | 106/814 |
| 6,340,650 | B1 | * | 1/2002 | Haun | 501/155 |
| 6,818,300 | B2 | * | 11/2004 | Loyd et al. | 428/406 |

FOREIGN PATENT DOCUMENTS

FR 1.368.607 7/1964

* cited by examiner

*Primary Examiner*—Karl Group
(74) *Attorney, Agent, or Firm*—Inger H. Eckert; James J. Dottavio

(57) ABSTRACT

The invention provides a method to transform large quantities of waste glass into useful ceramic products by a low-cost manufacturing process. The method improves green strength compared to previous methods, and does not require water or any other liquid solvent. Only one firing step is needed with a low peak firing temperature of about 700° C. to about 1000° C. The method conserves energy and natural resources compared to clay-based traditional ceramic manufacturing. High-quality impervious ceramic products can be produced by the invention.

20 Claims, No Drawings

CERAMIC PRODUCTS, RAW BATCH FORMULATIONS, AND METHOD

CROSS REFERENCE TO RELATED APPLICATIONS

I claim the benefit of U.S. Provisional Application No. 60/346,779 which was filed on Oct. 18, 2001.

BACKGROUND OF THE INVENTION

The invention is directed to ceramic products made from waste glass; raw batch formulations for making ceramic products from waste glass; and a method for making ceramic products from waste glass. The invention provides a low-cost method of manufacturing ceramic products from waste glass with the addition of a solid organic binder, without the use of water or any other liquid solvent. This method is especially useful for processing water-sensitive glass compositions into ceramic products, but water-insensitive glass compositions can also be used. A wide variety of ceramic products can be manufactured by the invention. Examples are provided where the invention is used to make ceramic tile from different types of recycled waste glass.

The invention also addresses two current problems: energy usage by the ceramic industry needs to be reduced; and new recycled-glass products are needed. The ceramic industry consumes large amounts of energy, especially during the firing process. Firing temperatures greater than 1200° C. (2200° F.) are required to sinter typical ceramic raw materials into dense products. Modifications of the raw material formulations have led to reductions in firing temperatures, but the improvements are limited because of the types of raw materials used. Most traditional ceramic products, such as tile and brick, consist mainly of clay-based raw materials, which inherently require high firing temperatures. Other ceramic manufacturing steps, such as the drying processes, are also very energy intensive. Energy costs are a major portion of the total manufacturing costs, and thus new methods to reduce the amount of energy required will be a great benefit to the ceramic industry.

New products utilizing recycled waste glass are needed to further promote glass recycling, because only a limited amount of glass can be remelted to make new containers (currently the primary use of recycled glass). New products are especially needed that are less sensitive to contaminants in the glass, and that can be made from green or mixed-color container glass waste. Research has been conducted and products developed using recycled glass as a ceramic raw material. However, processing problems have limited the developments, so that only a negligible amount of waste glass is currently utilized (excluding remelting to form new glass products). These problems occur because of inherent chemical and processing incompatibilities with traditional ceramic raw materials and manufacturing methods. These incompatibilities have greatly hampered the development of ceramic products from waste glass.

U.S. Pat. No. 6,340,650 reviews previous waste glass processing problems, and provides a new method to eliminate these problems by avoiding the use of water and clay in the processing. This method includes the addition of an organic binder to bond the waste glass particles together in the forming process. The organic binder is initially either in either a liquid or solid state. If a solid organic binder is used, then the binder is dissolved in a nonaqueous liquid. This method eliminates previous problems, however there are still some disadvantages. The present invention eliminates these disadvantages, as discussed in the following paragraphs.

To be effective an organic binder needs to be in liquid form, so that the waste glass particles can be wetted and coated by the organic binder. A single phase organic binder at room temperature (~20° C.) is in either a liquid or solid state. If an organic binder is in a liquid state, then the ceramic particles can be directly mixed with the binder to coat the particles. The mixture can then be formed into the desired article, but the green strength of the article will be low compared to if the binder is in a solid state. The green strength refers to the strength of the unfired green article produced after the forming step. The green strength needs to be high enough so that the articles can be transferred from the forming step to the firing step without breakage. In addition, the level of green strength required increases as the size of the article increases.

If the organic binder is in a solid state, then the binder can be dissolved in specific liquids, mixed with the waste glass particles, and then dried to remove the liquid to produce waste glass particles coated with the organic binder. Water is commonly used as the liquid. For water-sensitive ceramic raw materials, water can be replaced with nonaqueous liquids, such as alcohols. However, processing with non-aqueous liquids increases the cost and complexity of manufacturing, and can add environmental problems.

The present invention involves a new method of coating waste glass powder with a solid organic binder, which improves the green strength compared to when a liquid binder is used. The invention also eliminates the need for water or any other liquid solvent. In the invention the binder is initially a solid, which is then melted to form a liquid, coated on the glass powder, and cooled to solidify the binder to form a solid-binder-coated-glass mixture. The mixture is then formed into a green article, and fired into a high-quality ceramic product.

The invention can be used to produce an impervious ceramic microstructure with only a small amount of porosity. Impervious refers to ceramic products with very low water absorptions of less than 0.5%. An impervious ceramic microstructure with a small amount of porosity is critical to achieve high-quality properties. Ceramic products can be produced by the invention with a wide range of colors with smooth glossy glaze-like surfaces. The surface texture and other fired properties can also be adjusted by the addition of fillers, and/or by partial crystallization of the glass. The invention conserves energy and natural resources compared to traditional ceramic processing methods.

BRIEF SUMMARY OF THE INVENTION

The invention provides a method to transform large quantities of waste glass into useful ceramic products by a low-cost manufacturing process. The major steps of the method involve combining waste glass with a solid organic binder; melting the binder to form a liquid binder; mixing to coat the liquid binder on the waste glass particles; cooling to below the melting temperature of the binder; crushing and sieving the cooled mixture; forming the sieved material into a green article; heating the green article to burnout the organic binder; and then firing to produce a ceramic product. The method improves green strength compared to previous methods, and does not require water or any other liquid solvent. Only one firing step is needed with a low peak firing temperature of about 700° C. to about 1000° C. The method conserves energy and natural resources compared to clay-based traditional ceramic manufacturing. High-quality impervious ceramic products can be produced by the invention.

DETAILED DESCRIPTION OF THE INVENTION

The raw batch formulations of the invention consist of waste glass combined with organic binders. In the examples provide below, the waste glass consists of fiber glass, container glass, and flat glass. The organic binder in the examples consists of polyethylene glycol. Other types of waste glass and organic binders can be used without changing the scope of the invention. The waste glass can originate from industrial or post-consumer sources. The organic binders that are used in the invention must melt, when heated above the melting temperature of the binder, to a liquid state that will coat the ceramic raw material particles during mixing. After this heating and mixing process, the organic binder must transform to a solid state when cooled to below the melting temperature of the binder.

Other common ceramic processing additives, such as plasticizers, lubricants, preservatives, etc. can also be added to the raw batch formulation to further optimize the processing without changing the scope of the invention. These additives can be added before and/or after melting the organic binder.

Inorganic fillers can be added to the waste glass without changing the scope of the invention. Inorganic fillers can be added to modify the color, surface texture, or any other property of the final product. Inorganic fillers include ceramic raw materials and colorants. Fillers can be added individually or in combination. Examples of ceramic raw materials that can be added include, but are not limited to, alumina, silica, and zirconia. Fillers with coarse sized particles can also be added to adjust properties, such as improving slip resistance by roughing the surface texture.

The first step of the method consists of combining the waste glass with the organic binder and any other additives to be included at this stage of the process, according to the raw batch formulation. The preferred raw batch formulation is comprised of about 90 to about 99 weight percent waste glass, and about 1 to about 10 weight percent solid organic binder. If a filler is added to the raw batch formulation, then replacing about 0.1 to about 40 weight percent of the waste glass with filler is preferred. The amount of filler addition will depend on the type of waste glass used, and the final properties desired.

The waste glass should preferably be in powder form. The glass powder particle size required depends on the final properties desired. If water-sensitive waste glass is used, then dry processing of the waste glass powder is needed to produce an impervious ceramic product. The need for dry processing of water-sensitive glass compositions is discussed in detail in U.S. Pat. No. 6,340,650.

The raw batch materials can be mixed in any type of mixer that will uniformly distribute the raw batch components, such as a pan mixer, conical blender, ribbon mixer, rotating drum mixer, etc. This mixing step is preferable, but not a necessary step of the invention. The combined, and optionally mixed, raw batch materials are then heated to above the melting temperature of the organic binder. During this heating process the materials are mixed to coat the liquid organic binder on the waste glass particles to form a liquid-binder-coated-glass mixture. Various types of mixers with heating jackets can be used for this process, such as a rotating pan mixer with Muller-type wheels. Other methods of heating and mixing the materials can also be used without changing the scope of the invention.

After the heating and mixing steps, the liquid-binder-coated-glass mixture is cooled to below the melting temperature of the organic binder, so that the binder transforms back to a solid state and a solid-binder-coated-glass mixture is formed. Additional additives, as discussed above, can be combined with the cooled mixture at this stage of the process. The cooled mixture with any additional additives is then crushed to break up agglomerates and to provide further mixing. Example types of equipment that can be used include hammer mills, roller mills, and rotating pan mixers with Muller-type wheels. Any other type of milling and/or grinding equipment that will crush the agglomerates into a powder can be used for this step. After crushing, the material is then sieved to produce a more uniformly sized flowable powder. Various mesh size sieves can be used depending on the powder size desired for the forming process. The particles that do not pass through the sieve can be circulated back to the crushing step.

The sieved powder is then formed into a green article. Green here refers to the formed article in the unfired state. Any type of forming method can be used, such as pressing or extrusion. Preferably dry pressing is used. For dry pressing, the powder is placed in a metal die of the desired shape and pressed with rams to compact the powder. The pressed article is then removed from the die and fired in a kiln or furnace. An additional drying step in an oven can be included before firing to remove any liquid, if present. Preferably, this drying step is not required, because additional liquid was not included.

The initial stage of the firing process consists of binder burnout to remove the organic binder. Preferably the binder burnout is conducted during the initial heating of the ceramic articles for firing. Separate processes of binder burnout and firing can also be used. The specific binder burnout and firing profiles of temperature and time will depend on the raw batch formulation used. The preferred maximum firing temperature is from about 700° C. to about 1000° C.

The following paragraphs provide 16 examples of the invention. These examples demonstrate how the invention can be used to make ceramic tiles from different types of recycled waste glass. Most of the steps of the method are the same for each of the examples. The differences are from variations in the raw batch formulations, firing conditions, and sample size.

EXAMPLE 1

The raw batch formulation of Example 1 consisted of 94% fiber glass powder and 6% organic binder (percentages based on weight). The fiber glass powder was prepared from fiber glass waste obtained from a fiber glass manufacturer. The waste was from E-glass continuous fiber glass production, and had been processed into fibers less than about ¼ inch in length. The waste was dry milled in an alumina ball mill with alumina media, and then sieved through 100 mesh (<0.1 mm). The milled fiber glass powder was then combined with the organic binder in amounts based on the raw batch formulation. Polyethylene glycol (Carbowax PEG-8000 powder) from Union Carbide Corporation with a melting temperature range of 60–63° C. was used as the organic binder.

The fiber glass and organic binder powders were initially mixed in a plastic container by hand shaking. The glass-binder mixture was then transferred to a glass container and heated in an oven to about 90–95° C., which caused the organic binder to melt. After heating for about one hour, the mixture was taken out of the oven, and then quickly mixed and ground in the heated glass container with a ceramic pestle. The pestle had also been heated in the oven to about 90–95° C. During this mixing process the binder was in liquid form, which allowed the binder to coat and agglomerate the glass particles. The agglomerated glass-binder mixture was then kept at room temperature (~20° C.) for about one hour. This allowed the temperature of the mixture to decrease to below the melting temperature of the binder, which caused the binder to solidify and harden the agglomerates. The hardened agglomerated glass-binder mixture was then crushed and ground in a ceramic mortar and pestle, and sieved through a 100 mesh screen.

The sieved binder-coated glass powder was then pressed at 2,000 psi (pounds per square inch) in a 1.25 inch by 1.25 inch square metal die using a hydraulic press. The pressed articles were fired in a programmable box furnace to first burnout the organic binder, and then to sinter the glass powder into a dense ceramic product. A maximum temperature of 890° C. was held for 30 minutes. The resulting ceramic tiles had densities of ~2.60 g/cc (greater than 99% of the theoretical density of E-glass of 2.61 g/cc). The ceramic tiles were translucent with smooth glaze-like surfaces.

EXAMPLE 2

The same procedure described above for Example 1 was used for this example, except that a 2.5 inch by 2.5 inch square metal die was used. High quality tiles resulted similar to those of Example 1, except that the tiles had about four times larger surface area.

EXAMPLES 3–9

The same procedure described above for Example 1 was also used for these examples, except that one weight percent of the fiber glass powder was replaced by a colorant filler. Seven commercially available ceramic colorants were evaluated. Example 3 used a white colorant (Mason #6700); Example 4 a blue colorant (Mason #6306); Example 5 a black colorant (Mason #6109); Example 6 a yellow colorant (Mason #6405); Example 7 a red colorant (Mason #6003); Example 8 a green colorant (Mason #6201); and Example 9 a brown colorant (Mason #6163). High quality tile resulted similar to those of Example 1, except that the colors of the tile corresponded to the colorant used. These examples demonstrate the ability of producing ceramic tile from recycled waste glass with a wide range of colors by the invention.

EXAMPLE 10

The same procedure described above for Example 1 was used for this example, except that the fiber glass powder was replaced with container glass powder, and a maximum firing temperature of 800° C. was used with a 10 minute hold time at this temperature. The container glass powder was prepared from clear glass bottles and jars by a two step grinding process. In the first step whole glass containers were crushed in an in-house designed crushing system which involved crushing glass in a closed hard plastic chamber. The crushed glass was then sieved through 6 mesh (<3 mm). In the second step the <3 mm glass particles were dry milled in an alumina ball mill with alumina media, and then sieved through 100 mesh (<0.1 mm). The resulting tile samples had densities of ~2.47 g/cc (greater than 98% of the theoretical density of container glass of 2.51 g/cc). The samples were glossy white in color with smooth glaze-like surfaces.

EXAMPLES 11 AND 12

The same procedure described above for Example 10 was also used for these examples, except that the clear glass containers were replaced by green glass bottles in Example 11 and brown glass bottles in Example 12. High quality tiles resulted similar to those of Example 10, except that the Example 11 tiles were green colored, and the Example 12 tiles brown colored.

EXAMPLE 13

The same procedure described above for Example 10 was also used for this example, except that the container glass powder was replaced by mixed-color container glass powder which was prepared by the following procedure. Mixed-color container glass with a particle size <12 mesh (<1.7 mm) was obtained from a waste glass processing company. The glass was first dried in an oven at ~120° C. to remove moisture. The dried glass was milled in an alumina ball mill with alumina media, and then sieved through 100 mesh (<0.1 mm). High quality tile resulted similar to those of Example 10, except that the tiles were green colored.

EXAMPLE 14

The same procedure described above for Example 10 was also used for this example, except that the container glass powder was replaced by clear flat glass powder which was prepared by the following procedure. Clear flat glass with a particle size <12 mesh was obtained from a waste glass processing company. The glass was first dried in an oven at ~120° C. to remove moisture. The dried glass was milled in an alumina ball mill with alumina media, and then sieved through 100 mesh (<0.1 mm). High quality tile resulted similar to those of Example 10, except that the tiles were white colored.

EXAMPLE 15

The same procedure described above for Example 13 was used for this example, except that a 5 inch by 5 inch square metal die was used. High quality tiles resulted similar to those of Example 13, except that the tiles had about sixteen times larger surface area.

EXAMPLE 16

The same procedure described above for Example 14 was used for this example, except that a 5 inch by 5 inch square metal die was used. High quality tiles resulted similar to those of Example 14, except that the tiles had about sixteen times larger surface area.

A detailed description of the invention with examples was described above. It is understood that various other changes and modifications can be made to the present invention by those skilled in the art without departing from the scope of the invention. For example, a glaze can also be applied to the ceramic product if desired, but is not necessary. A glaze can be applied before firing, so that only one firing is required. A glaze can also be applied after firing, but then a second firing is required.

Examples were provided demonstrating that the invention can be used to produce ceramic tile from recycled waste glass with a wide range of colors and smooth glossy glaze-like surfaces. The surface texture and other fired properties can also be adjusted by the addition of fillers, and/or by partial crystallization of the glass. Other ceramic products can be manufactured by the invention, and other raw batch formulations used, without changing the scope of the invention.

The invention claimed is:

1. A method for making a ceramic product from waste glass, comprising:
   heating a solid organic binder to form a liquid organic binder;
   mixing the waste glass with the liquid organic binder to form a liquid-binder-coated glass mixture;
   cooling the liquid-binder-coated-glass mixture to form a solid-binder-coated-glass mixture;
   forming the solid-binder-coated-glass mixture into a green ceramic article;
   heating the green ceramic article to burnout the organic binder; and
   firing the green ceramic article to sinter the green ceramic article into the ceramic product.

2. The method according to claim 1, wherein the waste glass is selected from the group consisting of container glass waste, flat glass waste, fiber glass waste, and specialty glass waste.

3. The method according to claim 1, wherein the waste glass is provided in a glass powder form.

4. The method according to claim 1, wherein the waste glass is provided in a dry-processed glass powder form.

5. The method according to claim 1, wherein about 90 to about 99 weight percent of the solid-binder-coated-glass powder is comprised of the waste glass and about 1 to about 10 weight percent of the solid-binder-coated-glass powder is comprised of the solid organic binder.

6. The method according to claim 1, wherein the waste glass includes a filler.

7. The method according to claim 1, wherein the waste glass includes a filler selected from the group consisting of ceramic raw materials and colorants.

8. The method according to claim 1, wherein the waste glass includes a filler comprised of coarse-sized particles.

9. The method according to claim 1, wherein about 0.1 to about 40 weight percent of the waste glass is comprised of a filler.

10. The method according to claim 1, further including mixing the waste glass with the solid organic binder, before heating the solid organic binder to form a liquid organic binder.

11. The method according to claim 1, further including heating the waste glass to above the melting temperature of the solid organic binder, before mixing the waste glass with the liquid organic binder to form a liquid-binder-coated-glass mixture.

12. The method according to claim 1, further including crushing the solid-binder-coated-glass mixture to break up agglomerates and reduce the particle size of the solid-binder-coated-glass mixture.

13. The method according to claim 1, further including seiving the solid-binder-coated-glass mixture to control the particle size of the solid-binder-coated-glass mixture.

14. The method according to claim 1, wherein the forming comprises pressing or extrusion.

15. The method according to claim 1, wherein the firing comprises heating the green ceramic article to a maximum temperature of about 700° C. to about 1000° C.

16. The method according to claim 1, wherein the ceramic product comprises tile or brick.

17. The method according to claim 1, wherein the firing comprises partial crystallization of the ceramic product.

18. The method according to claim 1, wherein the ceramic product has a smooth glossy surface.

19. The method according to claim 1, wherein the ceramic product has a textured surface.

20. The method according to claim 1, wherein the ceramic product is further processed by applying a glaze thereon.

* * * * *